Figure 6:
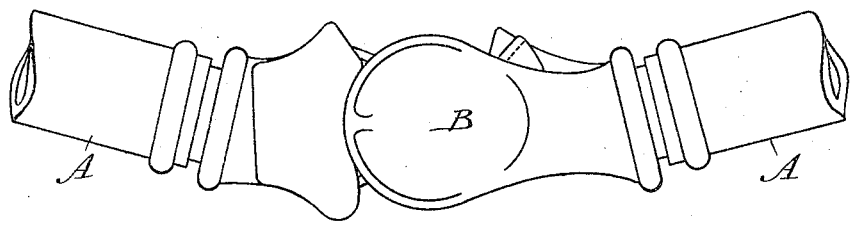

No. 807,499. PATENTED DEC. 19, 1905.
P. ROULSTONE.
HOSE COUPLING.
APPLICATION FILED MAY 10, 1905.
2 SHEETS—SHEET 1.
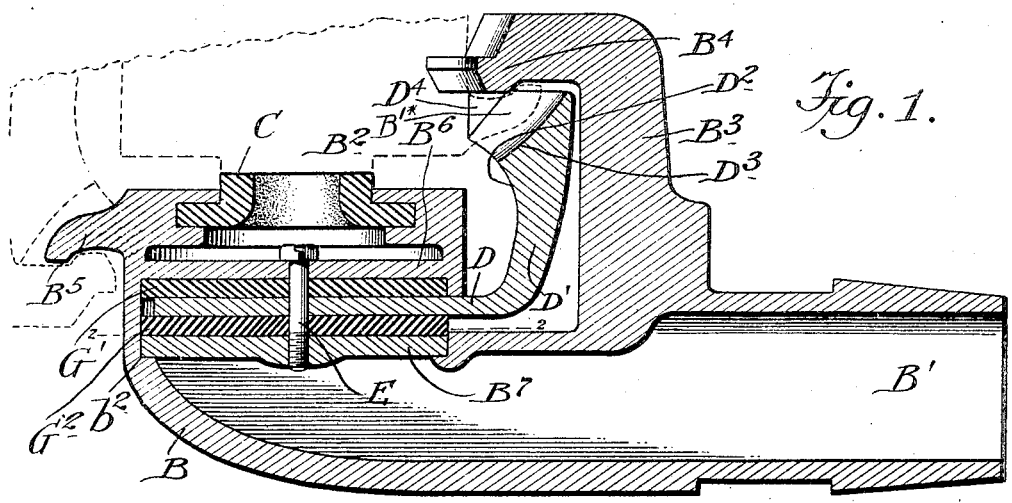
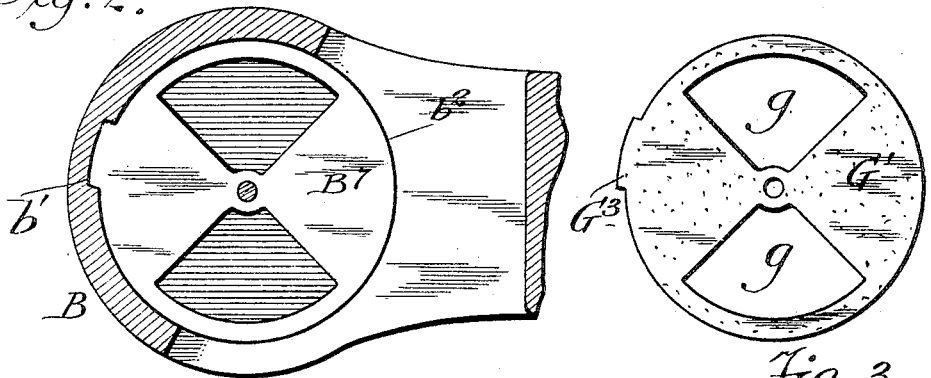
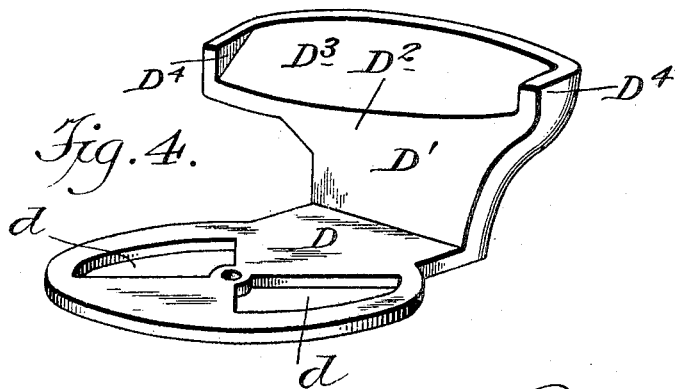
Witnesses
Inventor
Paul Roulstone
By his Attorney No. 807,499. PATENTED DEC. 19, 1905.
P. ROULSTONE.
HOSE COUPLING.
APPLICATION FILED MAY 10, 1905.

2 SHEETS—SHEET 2.

Witnesses
A. R. Appleman
Elvira Rasmussen

Inventor
Paul Roulstone
By his Attorney
Thomas Drew Stetson

UNITED STATES PATENT OFFICE.

PAUL ROULSTONE, OF BAYONNE, NEW JERSEY.

HOSE-COUPLING.

No. 807,499. Specification of Letters Patent. Patented Dec. 19, 1905.

Application filed May 10, 1905. Serial No. 259,794.

*To all whom it may concern:*

Be it known that I, PAUL ROULSTONE, a citizen of the United States, residing in Bayonne, in the county of Hudson and State of New Jersey, have invented a certain new and useful Improvement in Couplings for Hose Used in Connection with Air-Brakes for Railroad-Cars and Analogous Situations, of which the following is a specification.

I term this an "air-brake safety-coupling." It is operated in the same manner as a style now in common use. It can be used in engagement with such coupling now in use. I prefer to use each in connection with another of my couplings. All my couplings may be alike.

The improved construction belongs to that class in which the parts are locked together at will by applying a plane face on each fairly against a corresponding face on another coupling and turning the two couplings relatively to each other about a quarter of a revolution, so as to thereby engage or release strong fastenings. Such mode of operation is in common use and is much approved. I adopt it. Railroad practice has established uniform sizes and styles for the exteriors of these parts. I propose to have mine always conform thereto. The depth may be increased a little; but I attach much importance to the fact that the changes do not interfere with the use of my couplings miscellaneously with those now in use.

In the production of the main body I form below and parallel to the meeting face an integral partition with sufficiently-liberal apertures and with its upper face plane and smoothly finished. At a little distance from this I provide a seat in which I apply a corresponding separately-formed partition lying parallel to the fixed one, both shown as horizontal. In the extended space between these fixed partitions I work a valve in the form of a flat plate with capacity for being partially revolved. Both partitions and the valve and two thin rubber plates, which lie between as packings, are all apertured alike. I provide for partially revolving the valve automatically by the other coupling in the act of engaging or disengaging the couplings.

The ordinary angle-cocks may be used, if desired, in any special case; but my coupling will serve well without any cock after the coupling has been disconnected in retaining the air under full pressure in the pipes. I esteem it preferable to dispense with the angle-cocks and to have no other means of closing the hose than my valve. Such conditions avoid the chances of accidents from any angle-cock being through neglect or malice left closed when it should have been left open. My coupling is sure to be open when the connection is straightened.

The construction allows in the small space available sufficiently-liberal apertures and passages to put on the brakes with ordinary rapidity throughout the whole of a long train.

The following is what I consider the best means of carrying out the invention.

The accompanying drawings form a part of this specification.

Similar letters of reference indicate corresponding parts in all the figures where they appear.

Figure 5:
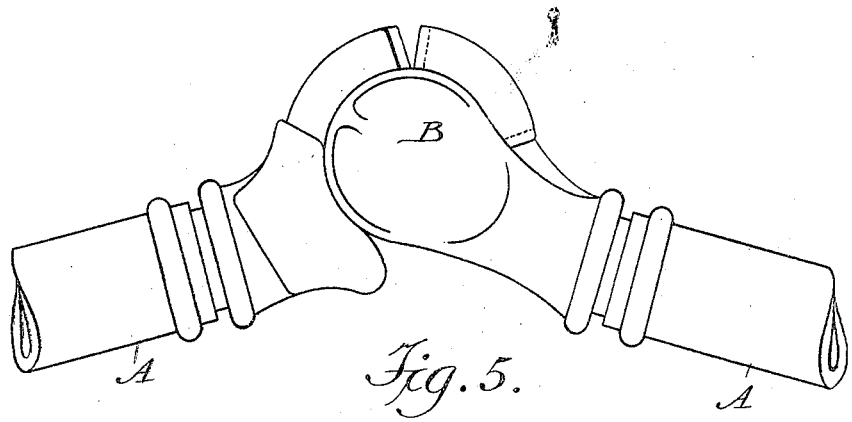
Figure 7:
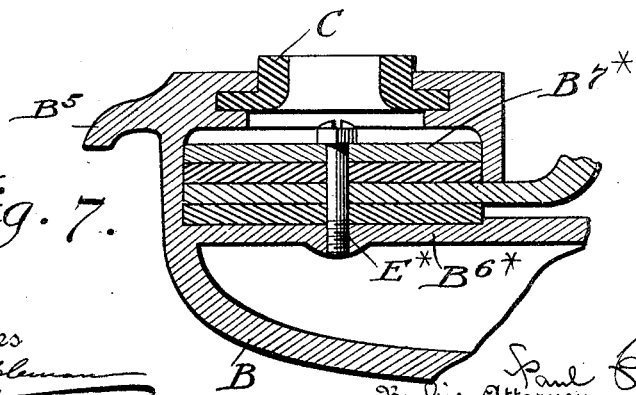

Figure 1 is a horizontal longitudinal section through one coupling and the adjacent parts of another coupled thereto. The nearest coupling is fully shown in strong lines. The farthest is in dotted lines, only partly shown. Fig. 2 is a vertical section on the line 2 2 in Fig. 1. Fig. 3 is a face view of one of the packings detached. Fig. 4 is a perspective view of one of the valves detached. Fig. 5 is a side view showing the two couplings engaged together. Fig. 6 is a corresponding view showing the two couplings in the act of being engaged or of being separated. Fig. 7 is a section corresponding to Fig. 2, but showing a modification.

Referring to Figs. 1 to 6, inclusive, A is a piece of hose connecting with the pipes and brake-cylinders of a car, (not shown,) and B is the main body of my coupling, an attachment of cast-iron or other suitable material, supernumerals being used when necessary to designate special parts thereof.

In use two couplings are matched together, forming a pair. The faces which are presented toward each other and maintain the air-tight joint in all positions are vertical, and the view in Fig. 1 is a horizontal or plan view; but I will for convenience sometimes refer to the parts by their positions in this drawing, Fig. 1, the nearest being shown as lowest. I will describe it as lowest.

$B^3$ is a long projection extending upward from one edge of the body B and having a hook or inward extension $B^4$, as shown. $B^5$ is a shorter arm or projection on the other side of the center. They perform the same functions as the corresponding parts of the ordinary couplings now in use. The hooks do not differ in any wise from the corresponding strong hooks of the standard couplings now in use. The neck B' engages permanently with the hose A. The face $B^2$ (the upper as shown) applies against the corresponding adjacent face shown as the lower face of the other coupling, making a tight joint therewith by the aid of the ordinary facing-ring C, projecting, as usual, a little beyond the face $B^2$.

In the body B, sufficiently within the face $B^2$, is an apertured disk which can be partially revolved. It is arranged to thus be partially turned between two similarly-apertured fixed partitions $B^6$ $B^7$, to be described farther on. This partially-revolving part (marked D, with supernumerals) constitutes a valve which is engaged by the short hook $B^5$ of the opposite coupling and is opened by the same turning motion which engages the hooks in uniting the two couplings together and is closed by the same turning motion which separates the couplings. This valve, of which there must of course be one in each coupling, is a disk having plane parallel faces and two approximately sector-shaped apertures $d\ d$ of liberal area. Each receives in its center a pivot-screw E. Its only motion relatively to the other parts is a partial revolution. Its head is six-sided and is also scored across. The apertures $d\ d$ provide the liberal spaces required for the strong flow of air. An arm extends outward at one edge of the valve and is formed upward, as indicated by D', and thickened and beveled inward at the upper end, as indicated by $D^2$. At the top of this arm D' is an internal shell $D^2$, on which are raised lips $D^4$ $D^4$, set wide enough apart to easily receive the short arm of the other coupling. It should be understood that the other coupling, partially shown in dotted lines, may be exactly similar to this coupling, which is fully shown and described. It is applied in a reversed position. The short arm of the coupling thus partially shown is marked B' with an asterisk—thus B'*. When two of my couplings are applied together and engage their arms and the couplings are pulled into a straight line, and thus partially revolved relatively to each other, such lips compel the valve to be turned into the open position. These lips also insure that when the couplings are again turned into the position at about a right angle each to the other, which is the movement to separate them, the valve shall by the same movement be turned into the completely-closed position before the couplings relax their hold on each other.

The fixed partitions may be now described. One is permanently fixed in the body B. I will describe it as $B^6$, the one nearest the bearing-face and cast integral with the body and set only so far from the bearing-face as to give space for the compressed air to flow freely inward in approaching and outward in leaving the joined faces $B^2$. The other partition $B^7$ is removable. It is held in a rabbet $b^2$, cast in the interior of the body. It is a sufficient distance from the other partition $B^6$ to allow room for the valve and for thin packing-disks, to be presently described. All are correspondingly apertured. The surfaces of the valve and of the engaging bearings though nearly parallel are not completely so. They are a little helical, so that turning them into the open position relaxes and into the closed position tightens their contact. It is practicable to thus make an air-tight fit with accurately-finished metal surfaces applied directly together; but I insure tightness with slight imperfections in the form and finish by providing two washers or packings of soft vulcanized rubber G' $G^2$, one matched against each of the two plane faces of the valve. They are alike. Each packing has two openings $g\ g$ matching the openings $d\ d$ in the valve D, and each has a projection $G^3$ on one edge, which, when the parts are inserted in their several places, matches into the corresponding recess $b'$ in the interior of the body on one side. In assembling the parts this partition and the packings and the valve are inserted laterally. The upper packing G' is pressed upward against the corresponding integral partition $B^6$. All these parts pertaining to the valve being placed in the required position in the body B, as shown, the pivot-screw E is introduced from above through the open face and screwed down into the threaded hole in $B^7$ and the whole is ready to serve.

I attach importance to the fact that the valve is turned by the aid of an arm reaching up outside of the fixed casings as distinguished from any connections inside, for the reason, among others, that the outside arm gives a greater leverage by which to effect the turning, and it leaves the passage for the air entirely unobstructed. The passage may be obviously smaller by reason of the latter fact.

Modifications may be made by any good mechanic without departing from the principle or sacrificing the advantages of the invention. The apertures in the valve may be varied in size and form, taking care to have those in the partitions and packings varied to match. I prefer two of approximately sector shapes, as shown. The width of the part D', and consequently the space between the side lips $D^3$, may be increased or diminished; but I prefer to have such space only enough greater than that of the hook $B^3$, which is received therein to allow them to engage when applied together with a considerable amount of variation in the angle.

Instead of making the partition $B^6$, which is nearest the bearing-face, integral with the main body and the partition $B^7$ removable, I can reverse their conditions. Fig. 7 shows such arrangement. There may be some advantages in such form in regard to the tightness when the couplings are separated with a high pressure retained. In this form the partition $B^{7*}$, the one nearest the bearing-face $B^2$, must be introduced and held up temporarily in the rabbet, while the valve and the packings, if packings are used, are inserted below it. The parts are secured by a pivot-screw corresponding to the pivot-screw of the principal form. In this form the pivot-screw $E^*$ must be strong and well-fitted, as it has to bear a tensile strain, due to the strong pressure of the air when the couplings are separated.

I claim as my invention—

1. In a hose-coupling having a bearing-face adapted to be partially revolved relatively to a corresponding face on another coupling, and having provisions for engaging and releasing by such movement, a body having an apertured partition parallel to such face in combination with a thin partially-revoluble plate, having corresponding apertures adapted to serve as a valve and an arm $D'$ extending outside of the casing and engaging with the opposite coupling, all arranged to serve substantially as herein specified.

2. In a hose-coupling having a bearing-face adapted to be partially revolved relatively to a corresponding face on another coupling, and having provisions for engaging and releasing by such movement, a body having an apertured partition parallel to such face in combination with a thin partially-revoluble plate, having corresponding apertures adapted to serve as a valve and an arm $D'$ extending outward from such plate having lips $D^4$ arranged to either be engaged and turned by another coupling in the acts either of engaging together the two couplings or of disengaging the same, all arranged to serve substantially as herein specified.

3. In a hose-coupling having a bearing-face adapted to be partially revolved relatively to a corresponding face on another coupling, and having provisions for engaging and releasing by such movement, a body having an apertured partition parallel to such face in combination with a thin partially-revoluble plate, having corresponding apertures adapted to serve as a valve and an arm $D'$ extending outward from such plate having lips $D^4$ arranged to be engaged and turned by another coupling in the acts either of engaging together the two couplings or of disengaging the same and having an arm adapted to serve in so operating a corresponding valve in the opposite coupling, all substantially as herein specified.

4. In a hose-coupling having a bearing-face adapted to be partially revolved relatively to a corresponding face on another coupling and having provisions for engaging and releasing by such movements, the body $B$ having the recess $b'$ and an apertured fixed partition $B^6$ formed integral therewith, the thin plate $D$ constituting a flat valve correspondingly apertured, in combination with each other and with a second partition $B^7$ apertured to correspond with both and adapted to be applied and removed as shown, and with provisions by a projection on such partition engaging in said recess $b'$ for holding the partition against turning, the packing $C\ C$ similarly held against turning and the pivot $E$ the latter parts being adapted to be inserted and removed, all to serve substantially as herein specified.

Signed at New York city, in the county of New York and State of New York, this 1st day of May, A. D. 1905.

PAUL ROULSTONE.

Witnesses:
WALTER T. SCOTT,
THOMAS DREW STETSON.